United States Patent
Zhu (10) Patent No.: US 12,091,136 B2
(45) Date of Patent: Sep. 17, 2024

(54) UNDERWATER PENETRATION SYSTEM FOR OFFSHORE WIND POWER AND COOPERATIVE OPERATION METHOD THEREOF

(71) Applicant: Guangdong Rich Offshore Wind Power Technology Co., Ltd, Guangdong (CN)

(72) Inventor: Ronghua Zhu, Guangdong (CN)

(73) Assignee: Guangdong Rich Offshore Wind Power Technology Co., Ltd, Guangdong (CN)

( * ) Notice: Subject to any disclaimer, the term of this patent is extended or adjusted under 35 U.S.C. 154(b) by 201 days.

(21) Appl. No.: 17/874,325

(22) Filed: Jul. 27, 2022

(65) Prior Publication Data

US 2023/0035365 A1 Feb. 2, 2023

(30) Foreign Application Priority Data

Jul. 30, 2021 (CN) .......................... 202110873917.2

(51) Int. Cl.
*B63B 21/27* (2006.01)
*B63B 21/50* (2006.01)
(Continued)

(52) U.S. Cl.
CPC .............. *B63B 21/27* (2013.01); *B63B 21/50* (2013.01); *F03D 13/22* (2016.05); *F03D 13/25* (2016.05);
(Continued)

(58) Field of Classification Search
CPC ... B63B 21/27; B63B 21/50; B63B 2021/505; F03D 13/22; F03D 13/25; F05D 2240/95; E02D 7/20; E02B 2017/0078
See application file for complete search history.

(56) References Cited

U.S. PATENT DOCUMENTS

| | | | | |
|---|---|---|---|---|
| 4,270,480 A | * | 6/1981 | Hancock | ................. B63B 21/27 114/296 |
| 5,224,962 A | * | 7/1993 | Karal | ..................... E02D 23/02 405/209 |

(Continued)

FOREIGN PATENT DOCUMENTS

CN 104929144 A * 9/2015

OTHER PUBLICATIONS

Gao et al.; CN-104929144-A translation; all; 2015 (Year: 2015).*

Primary Examiner — Benjamin F Fiorello
(74) Attorney, Agent, or Firm — JCIPRNET (57) ABSTRACT

The present belongs to offshore wind power engineering field, and particularly relates to a convenient-to-disassemble underwater penetration system for offshore wind power and an operation method thereof. The system includes a penetration device, a suction pump, a sonar ranging module and a control module. The penetration device is configured to be detachably butted with a suction bucket. The suction pump is configured to suck the suction bucket by the penetration device to settle the suction bucket. The sonar ranging module is configured to acquire settlement depth data of the suction bucket. The control module is configured to receive the data and to control the suction pump to work according to it, thereby achieving synchronous settlement of different suction buckets. The present invention is capable of achieving automatic multi-bucket synchronous penetration, thereby improving the installation efficiency of the suction bucket for offshore wind power, shortening construction time and reducing construction cost.

17 Claims, 4 Drawing Sheets

(51) Int. Cl.
  *F03D 13/20* (2016.01)
  *F03D 13/25* (2016.01)
(52) U.S. Cl.
  CPC ..... *B63B 2021/505* (2013.01); *F05B 2240/95* (2013.01)

(56) References Cited

U.S. PATENT DOCUMENTS

| | | | | |
|---|---|---|---|---|
| 6,122,847 | A * | 9/2000 | Treu | B63B 21/22 |
| | | | | 114/296 |
| 6,223,675 | B1 * | 5/2001 | Watt | E21B 41/04 |
| | | | | 405/190 |
| 7,621,059 | B2 * | 11/2009 | McCoy, Jr. | E02F 3/907 |
| | | | | 37/317 |
| 2006/0127187 | A1 * | 6/2006 | Raines | B63B 21/29 |
| | | | | 405/226 |
| 2009/0297276 | A1 * | 12/2009 | Foo | B63B 21/27 |
| | | | | 405/207 |
| 2020/0071899 | A1 * | 3/2020 | Dingman | F16L 55/1125 |
| 2023/0071305 | A1 * | 3/2023 | Van Blaaderen | E02D 27/525 |
| 2023/0332369 | A1 * | 10/2023 | Mathis | E02D 15/08 |

\* cited by examiner

UNDERWATER PENETRATION SYSTEM FOR OFFSHORE WIND POWER AND COOPERATIVE OPERATION METHOD THEREOF

CROSS-REFERENCE TO RELATED APPLICATION

This application claims the priority benefit of China application serial no. 202110873917.2, filed on Jul. 30, 2021. The entirety of the above-mentioned patent application is hereby incorporated by reference herein and made a part of this specification.

FIELD OF TECHNOLOGY

The present invention belongs to the field of offshore wind power engineering, and particularly relates to a underwater penetration system for offshore wind power and a cooperative operation method thereof.

BACKGROUND

Offshore wind power has become more and more attractive since it is a renewable green energy. Offshore wind power generation has been widely used due to its advantages of high energy density, little restriction by geographical environment factors, large total number of power generation hours, etc. However, affected by the complex marine environment, the construction of offshore wind power is also more difficult. At present, commonly used foundation forms include a gravity type foundation, a single pile foundation, a jacket foundation and a suction bucket foundation. The suction bucket foundation does not require seabed preparation, which is more convenient to construct and short in window phase, and can effectively shorten the construction period. As a result, it has developed rapidly in recent years and has been used in a plurality of offshore wind farms in China.

An underwater penetration system including a suction pump, an integrated control system and a frame, is a key component in the construction process of the suction bucket foundation, and be installed and be disassembled together with the suction bucket foundation under water. At present, the installation and disassembly processes of a suction bucket have a low degree of automation, and be controlled in real time by construction personnel on board, which takes a long time, is prone to failures, and greatly affects the construction efficiency and reliability of the suction bucket.

In addition, for the construction process of suction buckets for jackets, there are a plurality of suction bucket structures that need to be penetrated at the same time, and an allowable inclination angle for the installation of a suction bucket jacket foundation does not exceed 0.25° with higher requirement on the accuracy of penetration construction. At present, manual leveling is performed by construction personnel by controlling the flow rates of a plurality of suction pumps, which has greater technical difficulties and potential risks, lower efficiency and longer construction period.

SUMMARY

In order to make up for the deficiencies in the prior art, the present invention provides a technical solution of a underwater penetration system for offshore wind power and a cooperative operation method thereof.

Provided is a underwater penetration system for offshore wind power, including:
a penetration device configured to be detachably butted with a suction bucket;
a suction pump installed in cooperation with the penetration device and configured to suck the suction bucket by the penetration device to settle the suction bucket;
a sonar ranging module configured to acquire settlement depth data of the suction bucket; and
a control module configured to receive-data transmitted from the sonar ranging module and to control the suction pump to work according to the data, thereby achieving synchronous settlement of different suction buckets.

According to the underwater penetration system for offshore wind power, a flange inlet of the penetration device is butted with a flanged bucket opening of the suction bucket by an arranged quick-release butt joint assembly; the quick-release butt joint assembly includes a plurality of lock catches arranged around the flange inlet of the penetration device and rotatably matched with the flange inlet, and a plurality of hydraulic cylinders for driving the lock catches to move; and the lock catches are configured to be fastened with the flange inlet and the flanged bucket opening and to lock the flange inlet and the flanged bucket opening.

According to the underwater penetration system for offshore wind power, each of the hydraulic cylinders has one end rotatably matched with the penetration device, and the other end rotatably matched with the corresponding lock catch.

According to the underwater penetration system for offshore wind power, the penetration system further includes a penetration frame and a butt joint frame; the penetration frame is cooperatively connected with the penetration device; and the butt joint frame is fixedly installed on the suction bucket and configured to be butted with the penetration frame to achieve the alignment between the penetration device and the suction bucket.

According to the underwater penetration system for offshore wind power, the butt joint frame is fastened with the penetration frame by an arranged concave-convex structure.

According to the underwater penetration system for offshore wind power, the penetration system further includes an ultra-short baseline positioning module configured to acquire positioning data of the penetration frame and the butt joint frame.

According to the underwater penetration system for offshore wind power, the ultra-short baseline positioning module includes an underwater ultra-short baseline positioning transponder cooperatively installed on the butt joint frame and an underwater ultra-short baseline positioning transmitter arranged on the penetration frame.

Provided is an operation method of the penetration system, including the following steps:
step one: assembling penetration systems and suction buckets, and putting the penetration systems and the suction buckets into the seabed by using a crane;
step two: sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and
step three: when the penetration depth of the suction buckets reaches an expected depth, making the suction pumps stop working, separating the penetration devices from the suction buckets, and recovering the penetration systems by using the crane.

According to the operation method, in the step two, when the penetration systems are damaged, the penetration devices are separated from the suction buckets, and the penetration systems are lifted away by the crane for replacement and/or maintenance; during re-installation, positioning data, acquired by ultra-short baseline positioning modules, of penetration frames is transmitted to an operator, the operator operates the crane to work according to the positioning data, and the penetration frames and the penetration devices are respectively accurately aligned with butt joint frames and the suction buckets by using the crane; and after successful alignment, the penetration devices are butted with the suction buckets again.

DETAILED DESCRIPTION OF THE EMBODIMENTS

As shown in FIGS. 1-4, provided is a underwater penetration system for offshore wind power, including:
a penetration device 14, the penetration device 14 being configured to be detachably butted with a suction bucket and formed with a flange inlet 7 configured to be butted with the suction bucket, a suction opening configured to be connected with a suction pump 5, and a discharge opening 4 configured to discharge water and sand;
the suction pump 5, the suction pump 5 being installed in cooperation with the penetration device 14 and configured to suck the suction bucket by the penetration device 14 to settle the suction bucket;
a penetration frame 2, the penetration frame 2 being welded and matched with the penetration device 14, the penetration frame 2 being provided with lifting lugs 1 for a crane to lift;
a butt joint frame 12, the butt joint frame 12 being pre-fixed and installed to the suction bucket and configured to be butted with the penetration frame 12 to achieve the alignment between the penetration device 14 and the suction bucket;
a sonar ranging module 6, the sonar ranging module 6 being configured to acquire settlement depth data of the suction bucket; and
a control module 15, the control module 15 being configured to receive the data transmitted from the sonar ranging module 6 and to control the suction pump 5 to work according to the data transmitted from the sonar ranging module 6, thereby achieving synchronous settlement of different suction buckets.

Figure 1:
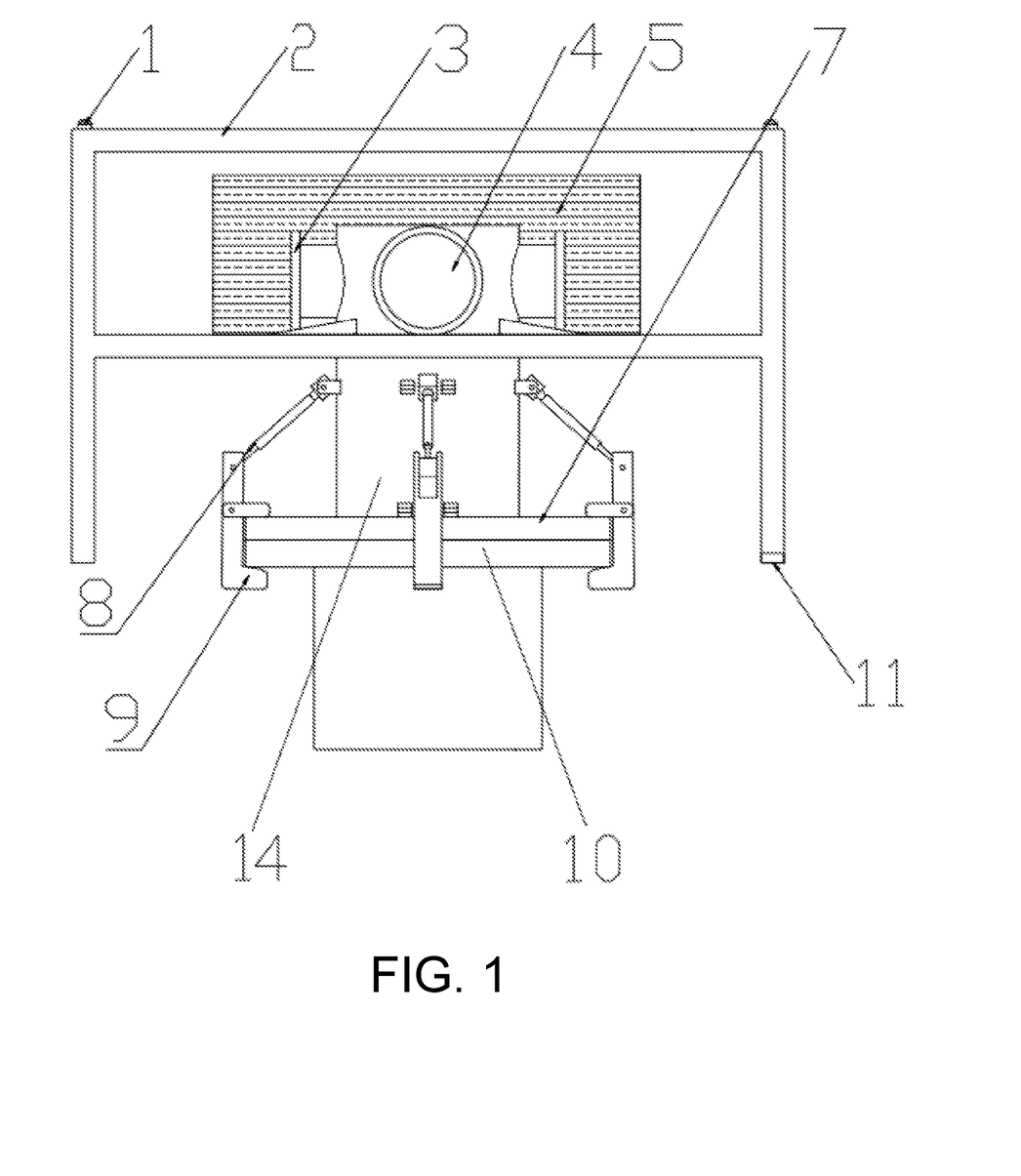
FIG. 1 is a first schematic structural diagram of a underwater penetration system for offshore wind power according to the present invention.
Figure 2:
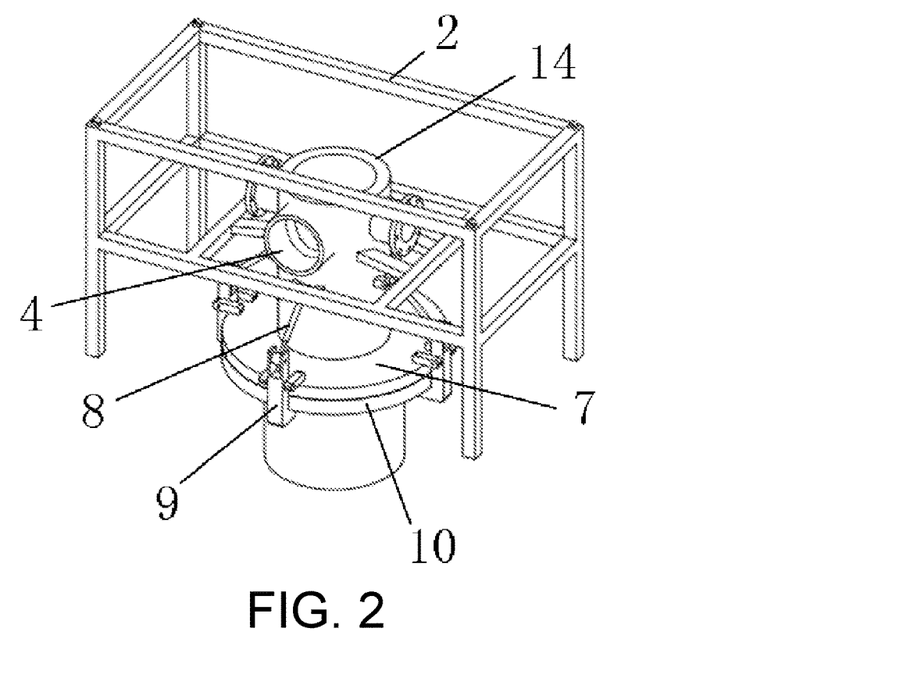
FIG. 2 is a second schematic structural diagram of a underwater penetration system for offshore wind power according to the present invention.

As an optimization, the flange inlet 7 of the penetration device 14 is butted with a flanged bucket opening 10 of the suction bucket by an arranged quick-release butt joint assembly; the quick-release butt joint assembly includes a plurality of lock catches 9 arranged around the flange inlet 7 of the penetration device 14 and rotatably matched with the flange inlet 7, and a plurality of hydraulic cylinders 8 for driving the lock catches 9 to move; the lock catches 9 are in a one-to-one correspondence with the hydraulic cylinders 8; and the lock catches 9 are configured to be fastened with the flange inlet 7 and the flanged bucket opening 10 and to lock the flange inlet and the flanged bucket opening. Each of the hydraulic cylinders 8 has one end rotatably matched with the penetration device 14, and the other end rotatably matched with the corresponding lock catch 9.

Figure 3:
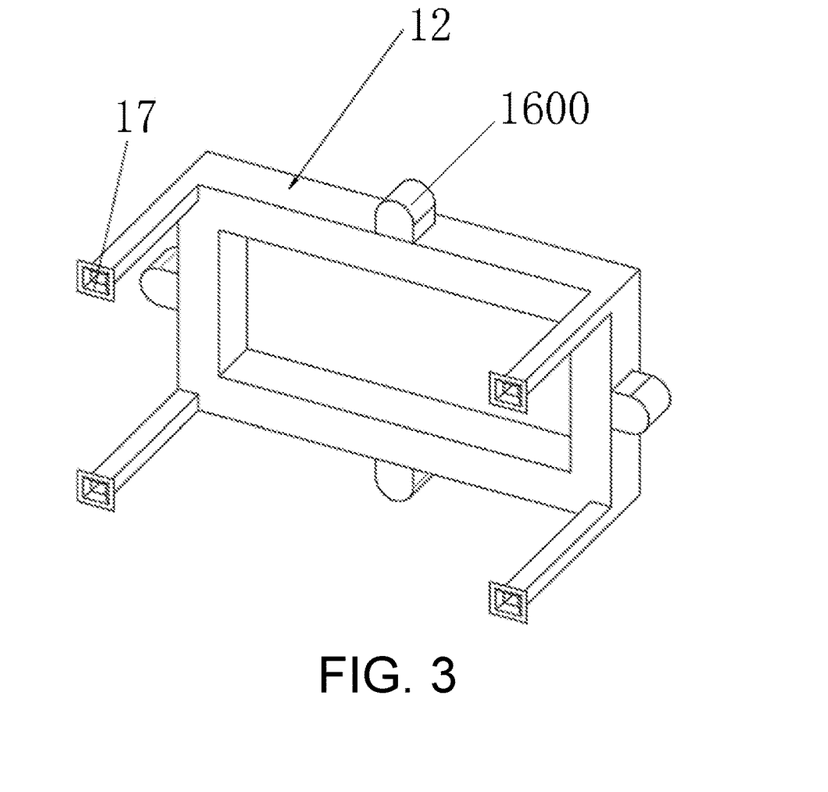
FIG. 3 is a schematic structural diagram of a butt joint frame in a underwater penetration system for offshore wind power according to the present invention.

As an optimization, the butt joint frame 12 is fastened with the penetration frame 2 by an arranged concave-convex structure. Specifically, the penetration frame 2 is provided with four first support legs, the bottom of each of the first support legs is provided with a bulge structure 11, the butt joint frame 12 is provided with four second support legs, the top of each of the second support legs is provided with a recess structure 17, the bulge structure 11 and the recess structure 17 are fastened, and the bulge structure 11 and the recess structure 17 are provided with corresponding chamfers, which can guide the bulge structure and the recess structure to be fastened more smoothly.

Figure 4:
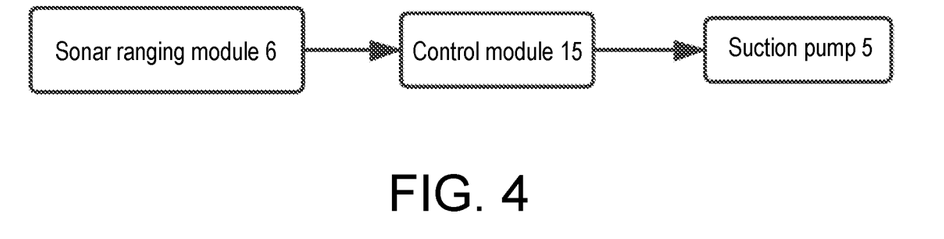
FIG. 4 is a schematic structural diagram of a circuit of a underwater penetration system for offshore wind power according to the present invention.

As an optimization, the sonar ranging module 6 and the control module 15 are cooperatively installed on the penetration frame 2 or the penetration device 14. In addition, the control module 15 may also be installed on a construction ship. The sonar ranging module 6, the control module 15 and the suction pump 5 are electrically connected in sequence by cables.

Figure 6:
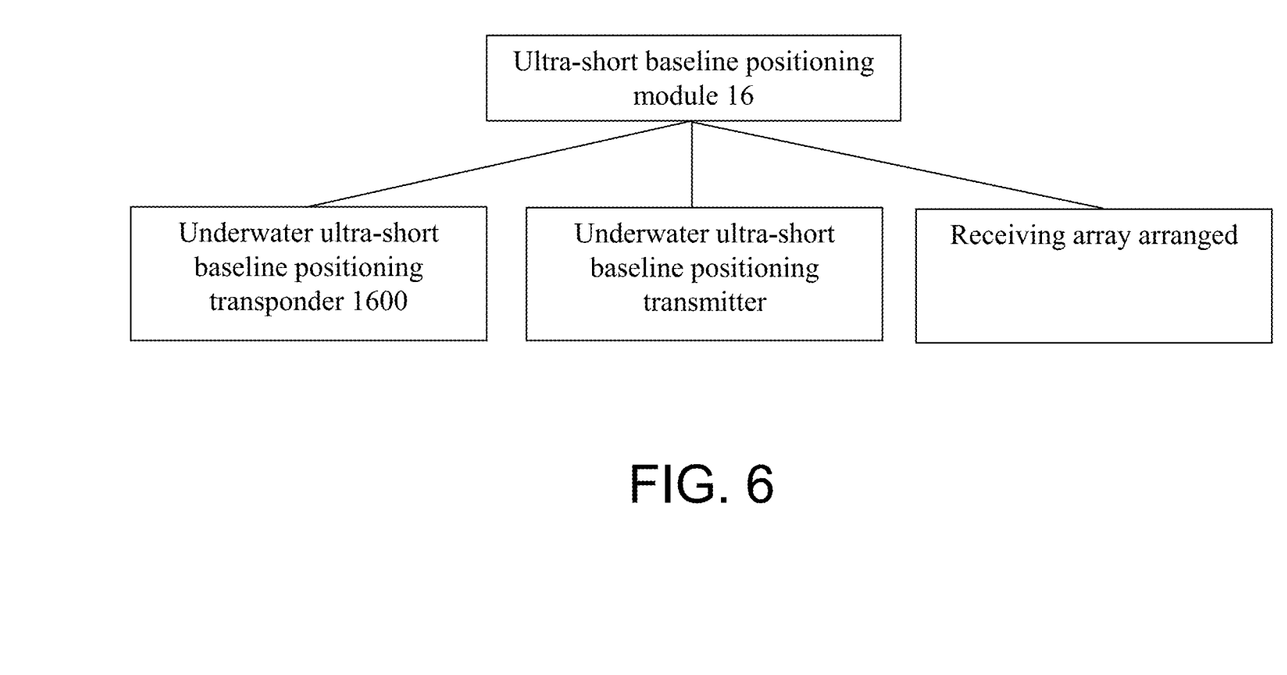
FIG. 6 is a schematic diagram of the ultra-short baseline positioning module 16 in the present invention.

As an optimization, FIG. 6 shows, the penetration system further includes an ultra-short baseline positioning module 16, the ultra-short baseline positioning module 16 being configured to acquire positioning data of the penetration frame 2 and the butt joint frame 12. The ultra-short baseline positioning module includes an underwater ultra-short baseline positioning transponder 1600 cooperatively installed on the butt joint frame 12, and an underwater ultra-short baseline positioning transmitter and a receiving array arranged on the penetration frame 2, the underwater ultra-short baseline positioning transmitter being connected with a host on the construction ship by a cable and transmitting the positioning data to the construction ship. The ultra-short baseline positioning module sends out sound pulses by the underwater ultra-short baseline positioning transmitter on the penetration frame 2, the sound pulses are sent back after being received by the underwater ultra-short baseline positioning transponder 1600, a phase difference between two directions of X and Y is measured after the sound pulses are received by the receiving array, and a distance R between the butt joint frame 12 and the receiving array is calculated out according to arrival time of sound waves, thereby calculating the position of the butt joint frame 12 on plane coordinates and the depth of the butt joint frame 12.

Figure 5:
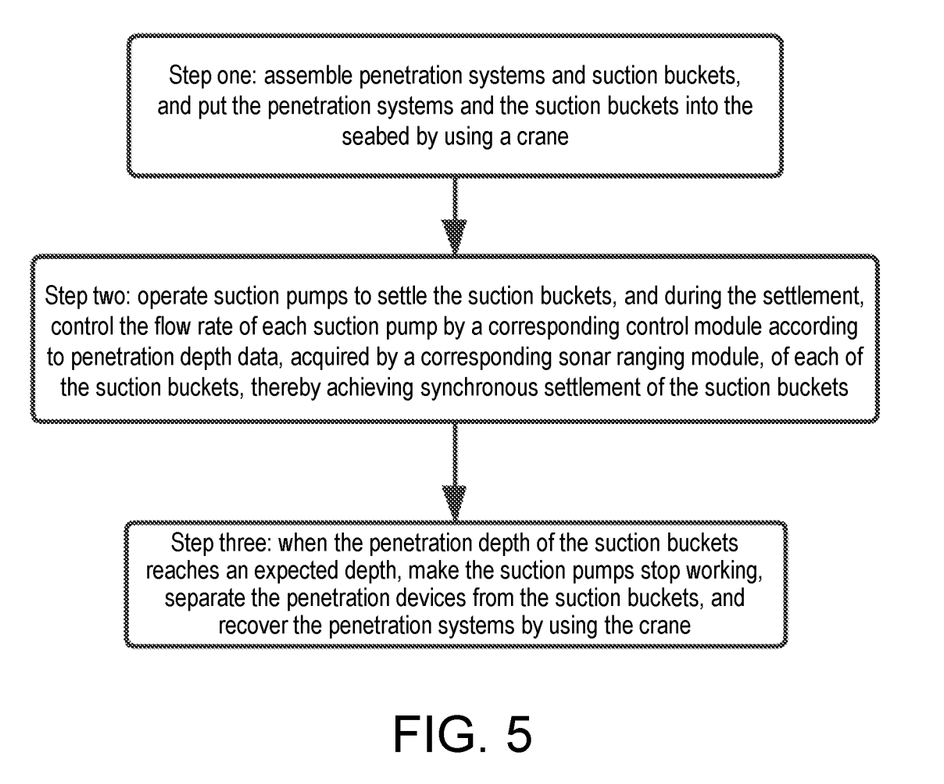
FIG. 5 is a flow chart of an operation method according to the present invention.

As shown in FIG. 5, provided is an operation method of the penetration system, including the following steps:
step one: penetration systems and suction buckets are assembled, and the penetration systems and the suction buckets are put into the seabed by using a crane;

step two: the suction buckets are sucked by using suction pumps 5 to settle the suction buckets, and during the settlement, and a corresponding control module 15 controls the flow rate of each suction pump 5 according to penetration depth data, acquired by a corresponding sonar ranging module 6, of each of the suction buckets, thereby achieving synchronous settlement of the suction buckets; and step three: when the penetration depth of the suction buckets reaches an expected depth, the suction pumps 5 stop working, the penetration devices 14 are separated from the suction buckets, and the penetration systems are recovered by using the crane.

Further explanation of the above operation method is as follows: for example, there are three suction buckets that need to be penetrated, each of the suction buckets is equipped with a penetration device 14, a suction pump 5 and corresponding accessories, and each penetration device 14 is provided with a sonar ranging module 6; the sonar ranging modules 6 are configured to measure the penetration depths of the suction buckets and transmit data to a control module 15; the control module 15 processes the penetration depth data of the three suction buckets; and when the penetration depths of the three suction buckets are inconsistent, the control module 15 controls the suction pumps 5 to adjust the flow rates, such that the suction pump 5 corresponding to the suction bucket fast to settle reduces the flow rate, and the suction pump 5 corresponding to the suction bucket slow to settle increases the flow rate, thereby keeping the penetration depths of the three suction buckets consistent, and achieving synchronous penetration.

Further, in the step two, when the penetration systems are damaged, an operator on a construction ship sends instructions to hydraulic cylinders 8 by a host, the hydraulic cylinders 8 drive lock catches 9 to perform unlocking to separate the penetration devices 14 from the suction buckets, and then the penetration systems are lifted away by the crane for replacement and/or maintenance; during re-installation, positioning data of butt joint frames 12 is acquired by using ultra-short baseline positioning modules 16, and the operator on the construction ship operates the crane in real time according to the positioning data to enable the penetration frames 2 and the penetration devices 14 to be respectively accurately aligned with the butt joint frames 12 and the suction buckets; and after successful alignment, the lock catches 9 are driven by using the hydraulic cylinders 8 to lock flanged bucket openings 10 and flange inlets 7, and the penetration devices 14 are detachably butted with the suction buckets. Next, the step three continues to be performed.

Compared with a conventional method, the present invention has the innovation points:

1) Compared with a conventional construction method for the suction bucket, the present invention is capable of achieving automatic multi-bucket synchronous penetration, thereby greatly improving the installation efficiency of the suction bucket for offshore wind power, shortening the construction time, and reducing the construction cost.

2) Compared with conventional construction of the suction bucket, the present invention has the characteristic that the penetration device is connected with the suction bucket by the quick-release butt joint assembly, which is efficient and reliable, and facilitates automatic disassembly.

3) The present invention is capable of realizing the precise underwater installation of the penetration device and the suction bucket by means of the ultra-short baseline positioning module.

What is claimed is:

1. A underwater penetration system for offshore wind power, comprising:
   a penetration device, the penetration device being configured to be detachably butted with a suction bucket;
   a suction pump, the suction pump being installed in cooperation with the penetration device and configured to suck the suction bucket by the penetration device to settle the suction bucket;
   a sonar ranging module, the sonar ranging module being configured to acquire settlement depth data of the suction bucket; and
   a control module, the control module being configured to receive the data transmitted from the sonar ranging module and to control the suction pump to work according to the data, thereby achieving synchronous settlement of different suction buckets,
   wherein a flange inlet of the penetration device is butted with a flanged bucket opening of the suction bucket by an arranged quick-release butt joint assembly; the quick-release butt joint assembly comprises a plurality of lock catches arranged around the flange inlet of the penetration device and rotatably matched with the flange inlet, and a plurality of hydraulic cylinders for driving the lock catches to move; and the lock catches are configured to be fastened with the flange inlet and the flanged bucket opening and to lock the flange inlet and the flanged bucket opening.

2. The underwater penetration system for offshore wind power according to claim 1, wherein each of the hydraulic cylinders has one end rotatably matched with the penetration device, and the other end rotatably matched with the corresponding lock catch.

3. An operation method of the penetration system according claim 2, the method comprises:
   assembling penetration systems and suction buckets, and putting the penetration systems and the suction buckets into the seabed by using a crane;
   sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and
   when the penetration depth of the suction buckets reaches an expected depth, making the suction pumps stop working, separating penetration devices from the suction buckets, and recovering the penetration systems by using the crane.

4. The operation method according to claim 3, wherein the sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets further comprises:
   when the penetration systems are damaged, the penetration devices are separated from the suction buckets, and the penetration systems are lifted away by the crane for replacement and/or maintenance;

during re-installation, positioning data, acquired by an ultra-short baseline positioning modules, of the penetration frames is transmitted to an operator, the operator operates the crane to work according to the positioning data, and the penetration frames and the penetration devices are respectively accurately aligned with the butt joint frames and the suction buckets by using the cane; and after successful alignment, the penetration devices are butted with the suction buckets again.

5. The underwater penetration system for offshore wind power according to claim 1, wherein the convenient-to-disassemble underwater penetration system further comprises:

a penetration frame; and a butt joint frame;

the penetration frame is cooperatively connected with the penetration device; and the butt joint frame is fixedly installed on the suction bucket and configured to be butted with the penetration frame to achieve the alignment between the penetration device and the suction bucket.

6. The underwater penetration system for offshore wind power according to claim 5, wherein the butt joint frame is fastened with the penetration frame by an arranged concave-convex structure.

7. An operation method of the penetration system according claim 6, the method comprises:

assembling penetration systems and suction buckets, and putting the penetration systems and the suction buckets into the seabed by using a crane;

sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and when the penetration depth of the suction buckets reaches an expected depth, making the suction pumps stop working, separating penetration devices from the suction buckets, and recovering the penetration systems by using the crane.

8. The operation method according to claim 7, wherein the sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets further comprises:

when the penetration systems are damaged, the penetration devices are separated from the suction buckets, and the penetration systems are lifted away by the crane for replacement and/or maintenance;

during re-installation, positioning data, acquired by an ultra-short baseline positioning modules, of the penetration frames is transmitted to an operator, the operator operates the crane to work according to the positioning data, and the penetration frames and the penetration devices are respectively accurately aligned with the butt joint frames and the suction buckets by using the cane; and after successful alignment, the penetration devices are butted with the suction buckets again.

9. The underwater penetration system for offshore wind power according to claim 5, wherein the convenient to disassemble underwater penetration system further comprises an ultra-short baseline positioning module, and the ultra-short baseline positioning module is configured to acquire positioning data of the penetration frame and the butt joint frame.

10. The underwater penetration system for offshore wind power according to claim 9, wherein the ultra-short baseline positioning module comprises an underwater ultra-short baseline positioning transponder cooperatively installed on the butt joint frame and an underwater ultra-short baseline positioning transmitter arranged on the penetration frame.

11. An operation method of the penetration system according claim 10, the method comprises:

assembling penetration systems and suction buckets, and putting the penetration systems and the suction buckets into the seabed by using a crane;

sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and when the penetration depth of the suction buckets reaches an expected depth, making the suction pumps stop working, separating penetration devices from the suction buckets, and recovering the penetration systems by using the crane.

12. An operation method of the penetration system according claim 9, the method comprises:

assembling penetration systems and suction buckets, and putting the penetration systems and the suction buckets into the seabed by using a crane;

sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and when the penetration depth of the suction buckets reaches an expected depth, making the suction pumps stop working, separating penetration devices from the suction buckets, and recovering the penetration systems by using the crane.

13. The operation method according to claim 12, wherein the sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets further comprises:

when the penetration systems are damaged, the penetration devices are separated from the suction buckets, and the penetration systems are lifted away by the crane for replacement and/or maintenance;

during re-installation, positioning data, acquired by the ultra-short baseline positioning modules, of the penetration frames is transmitted to an operator, the operator operates the crane to work according to the positioning data, and the penetration frames and the penetration devices are respectively accurately aligned with the butt joint frames and the suction buckets by using the cane; and after successful alignment, the penetration devices are butted with the suction buckets again.

14. An operation method of the penetration system according claim 5, the method comprises:
- assembling penetration systems and suction buckets, and putting the penetration systems and the suction buckets into the seabed by using a crane;
- sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and
- when the penetration depth of the suction buckets reaches an expected depth, making the suction pumps stop working, separating penetration devices from the suction buckets, and recovering the penetration systems by using the crane.

15. The operation method according to claim 14, wherein the sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets further comprises:
- when the penetration systems are damaged, the penetration devices are separated from the suction buckets, and the penetration systems are lifted away by the crane for replacement and/or maintenance;
- during re-installation, positioning data, acquired by an ultra-short baseline positioning modules, of the penetration frames is transmitted to an operator, the operator operates the crane to work according to the positioning data, and the penetration frames and the penetration devices are respectively accurately aligned with the butt joint frames and the suction buckets by using the cane; and
- after successful alignment, the penetration devices are butted with the suction buckets again.

16. An operation method of the penetration system according claim 1, the method comprises:
- assembling penetration systems and suction buckets, and putting the penetration systems and the suction buckets into the seabed by using a crane;
- sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets; and
- when the penetration depth of the suction buckets reaches an expected depth, making the suction pumps stop working, separating penetration devices from the suction buckets, and recovering the penetration systems by using the crane.

17. The operation method according to claim 16, wherein the sucking the suction buckets by using suction pumps to settle the suction buckets, and during the settlement, controlling the flow rate of each suction pump by a corresponding control module according to penetration depth data, acquired by a corresponding sonar ranging module, of each of the suction buckets, thereby achieving synchronous settlement of the suction buckets further comprises:
- when the penetration systems are damaged, the penetration devices are separated from the suction buckets, and the penetration systems are lifted away by the crane for replacement and/or maintenance;
- during re-installation, positioning data, acquired by an ultra-short baseline positioning modules, of the penetration frames is transmitted to an operator, the operator operates the crane to work according to the positioning data, and the penetration frames and the penetration devices are respectively accurately aligned with the butt joint frames and the suction buckets by using the cane; and
- after successful alignment, the penetration devices are butted with the suction buckets again.

* * * * *